(12) United States Patent
Carnevali (10) Patent No.: US 6,902,089 B2
(45) Date of Patent: Jun. 7, 2005

(54) QUICK RELEASE TOOL MOUNTING BRACKET

(76) Inventor: Jeffrey D. Carnevali, 3262 - 36 Ave. SW., Seattle, WA (US) 98126

( * ) Notice: Subject to any disclaimer, the term of this patent is extended or adjusted under 35 U.S.C. 154(b) by 333 days.

(21) Appl. No.: 09/945,126

(22) Filed: Aug. 31, 2001

(65) Prior Publication Data

US 2003/0042283 A1 Mar. 6, 2003

(51) Int. Cl.[7] .............................................. B60R 11/00
(52) U.S. Cl. ..................... 224/553; 224/401; 224/442; 224/571; 224/913; 224/916
(58) Field of Search ............................... 224/560, 567, 224/571, 441, 442, 553, 401, 420, 443, 445, 446, 913, 916

(56) References Cited

U.S. PATENT DOCUMENTS

| | | | | |
|---|---|---|---|---|
| 492,740 A | * | 2/1893 | Copeland .................... 224/442 |
| 1,688,765 A | * | 10/1928 | Veras .......................... 248/103 |
| 4,607,772 A | * | 8/1986 | Hancock ..................... 224/442 |
| 5,697,181 A | * | 12/1997 | Savant .......................... 42/94 |
| 5,791,610 A | * | 8/1998 | Sanchez .................. 248/176.1 |
| 5,839,632 A | * | 11/1998 | Koday ........................ 224/414 |
| 6,199,734 B1 | | 3/2001 | Meeks | |
| 6,484,913 B1 | * | 11/2002 | Hancock et al. ............ 224/401 |

* cited by examiner

*Primary Examiner*—Stephen K. Cronin
(74) *Attorney, Agent, or Firm*—Charles J. Rupnick Attorney at Law (57) ABSTRACT

A tool bracket for elongated tools. The tool bracket includes a mounting base having a mechanism for attaching to an external structure, a forked tool holder rotatably coupled to the mounting base and having pair of interconnected tines projecting from a neck portion, and a resilient biasing member coupled between the mounting base and the forked tool holder for urging relative rotation between the forked tool holder and the mounting base.

23 Claims, 8 Drawing Sheets

QUICK RELEASE TOOL MOUNTING BRACKET

FIELD OF THE INVENTION

The present invention relates generally to brackets for holding and transporting tools, and in particular to quick release brackets for holding tools having elongated portions, including such tools as rifles, archery bows, fishing poles, shovels, snow and water skis, and similarly shaped tools.

BACKGROUND OF THE INVENTION

Various types of holders have been developed for holding and transporting tools having elongated portions, including those holders adapted to be mounted on a motorized vehicle, such as an automobile, truck, all terrain vehicle (ATV), and boat.

Figure 1:
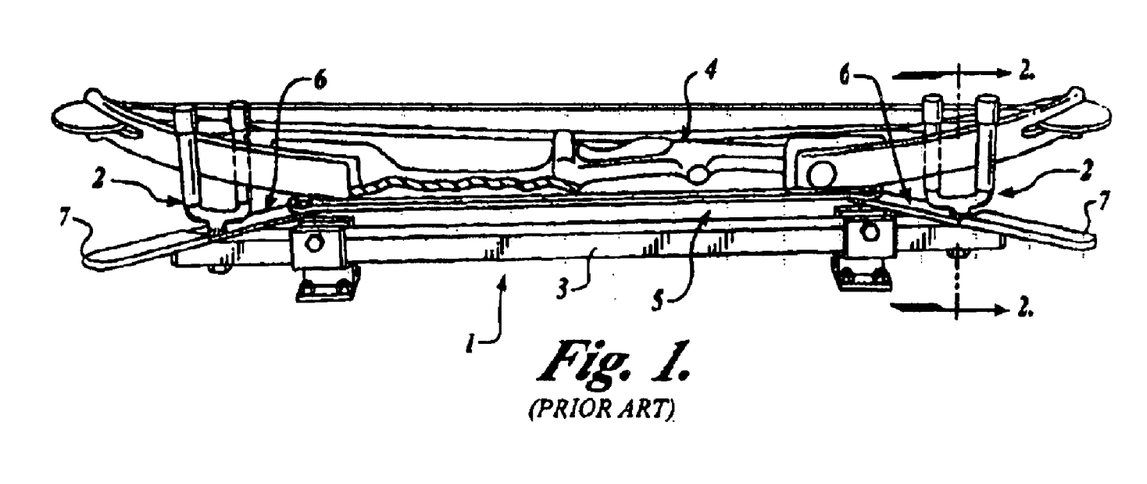
FIG. 1 shows the archery bowholder described in U.S. Pat. No. 6,199,734.

FIG. 1 illustrates one such known holder described in U.S. Pat. No. 6,199,734 as an archery bowholder 1 that is characterized by a pair of spaced apart, somewhat U-shaped upstanding support brackets 2 that are mounted on a support bar or frame member 3 for pivotal movement and wherein the brackets 2 are each resiliently biased into a position to snugly retain an archery bow 4 supported thereon in such a way that the bow 4 may be removably mounted on the bowholder 1. The bowholder support brackets 2 are interconnected by an elastic member 5 connected to opposed bracket pivot arms 6, each pivot arm 6 including a handle portion 7 for rotating one or both of the support brackets 2 to release gripping engagement with a bow 4 retained in the bowholder 1.

Figure 2:
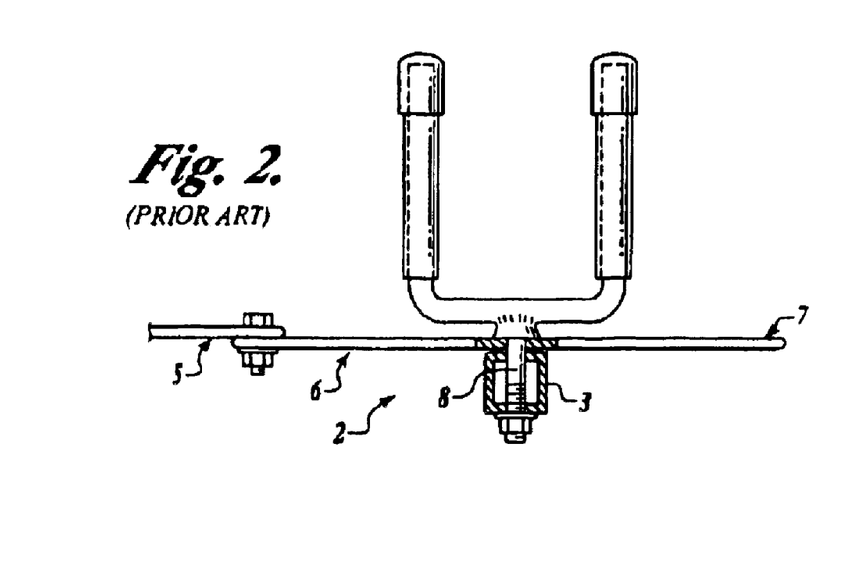
FIG. 2 shows one of the support brackets of the archery bowholder described in U.S. Pat. No. 6,199,734, as shown in FIG. 1.

FIG. 2 shows one of the support brackets 2 enlarged for clarity. FIG. 2 includes an illustration of how the support bracket 2 is mounted for rotation on the frame member 3 by a rod 8 passing therethrough, and the interconnection of the pivot arm 6 to the base of each support bracket 2 for rotating the respective support bracket 2 using the handle portion 7 of the pivot arm 6.

Generally, the holding force exerted by such currently known holders varies as a function of such factors as the separation between the support brackets 2 on the frame member 3, the length and resiliency of the elastic member 5, and both the shape and size of the archery bow 4 supported thereon. This variation in such structural and operational factors tends to permit the archery bow 4 or other elongated tool to slip within the support brackets 2 when vibration or shock-induced forces act on the archery bow 4 or other elongated tool during motion of the vehicle.

SUMMARY OF THE INVENTION

The present invention provides a quick release mounting bracket for tools having elongated handles or other elongated structural portions that overcomes the limitations of the prior art by providing a novel independently spring-loaded bracket structure that accepts and subsequently securely, but gently, retains an elongated portion of a tool for either storage or transportation.

The novel independently spring-loaded bracket structure of the present invention provides certain characteristics desirable in the art of holders for elongated tool that have not been satisfied by prior art devices, including a desire to snugly retain an elongated portion of a tool on the bracket in a fashion that permits quick and convenient mounting and removal of the tool from the tool holder without risk of damage to the tool.

Other desirable characteristics heretofore missing in the art of holders for elongated tool are provided by the present invention, including a bracket or holder which is able to hold tools having elongated portions of various sizes and configurations, without requiring adjustment of the tool attachment points. Still further desirable characteristics provided by the present invention include an ability to readily adapt the bracket or holder to mounting on, and support by, various fixed and movable structures, including the cargo deck or rack of a motor vehicle, such as an ATV.

The present invention is a tool bracket including a mounting base having a mechanism for attaching to an external structure; a forked tool holder rotatably coupled to the mounting base and having pair of interconnected tines projecting from a neck portion; and a resilient biasing member coupled between the mounting base and the forked tool holder for urging relative rotation between the forked tool holder and the mounting base.

According to one embodiment of the invention, the mounting base may include an internal cavity which is formed opposite from the mechanism for attaching to an external structure. The internal cavity has structure for engaging a first portion of the resilient biasing member. Furthermore, the forked tool holder may also include an internal cavity which is formed opposite from the neck portion and the interconnected tines projecting therefrom. The internal cavity has structure for engaging a second portion of the resilient biasing member opposite from the first portion engaged by the mounting base.

According to one embodiment of the invention, the resilient biasing member is a torsional spring. For example, the resilient biasing member is a torsional spring selected from the group of torsional springs including a torsional coil spring, a straight bar spring, and any other conventional torsional spring.

According to one embodiment of the invention, the mechanism of the mounting base for attaching to an external structure is optionally a clamp portion structured for mounting on a substantially round external structure. For example, the clamp portion includes a pair of spaced-apart legs formed with a substantially round aperture therethrough for passing over the external structure and being secured thereto. Alternatively, the mechanism structured with a threaded member for mounting to a cargo deck or rack of a motorized vehicle, such as an ATV, wherein the threaded member is passed through one or more concentrically aligned apertures in the cargo deck or rack.

The novel independently spring-loaded bracket structure of the present invention can be used singly, in pairs, or in larger numbers to effectively provide quick and convenient tool mounting and removal without risk of damage to the tool.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

In FIG. 10, the foot portion includes an internal annular groove that interfits with a lip that extends radially from the outer surface of the shoe portion. In FIG. 11 the foot portion includes an annular groove formed in the edge thereof. FIG. 11 also shows the spring support pin is embodied as a threaded rod that extends from the neck portion in the floor of the foot portion opposite the tines, and through an aperture in the floor of the shoe portion.

DETAILED DESCRIPTION OF PREFERRED EMBODIMENT

In the Figures, like numerals indicate like elements.

Figure 3:
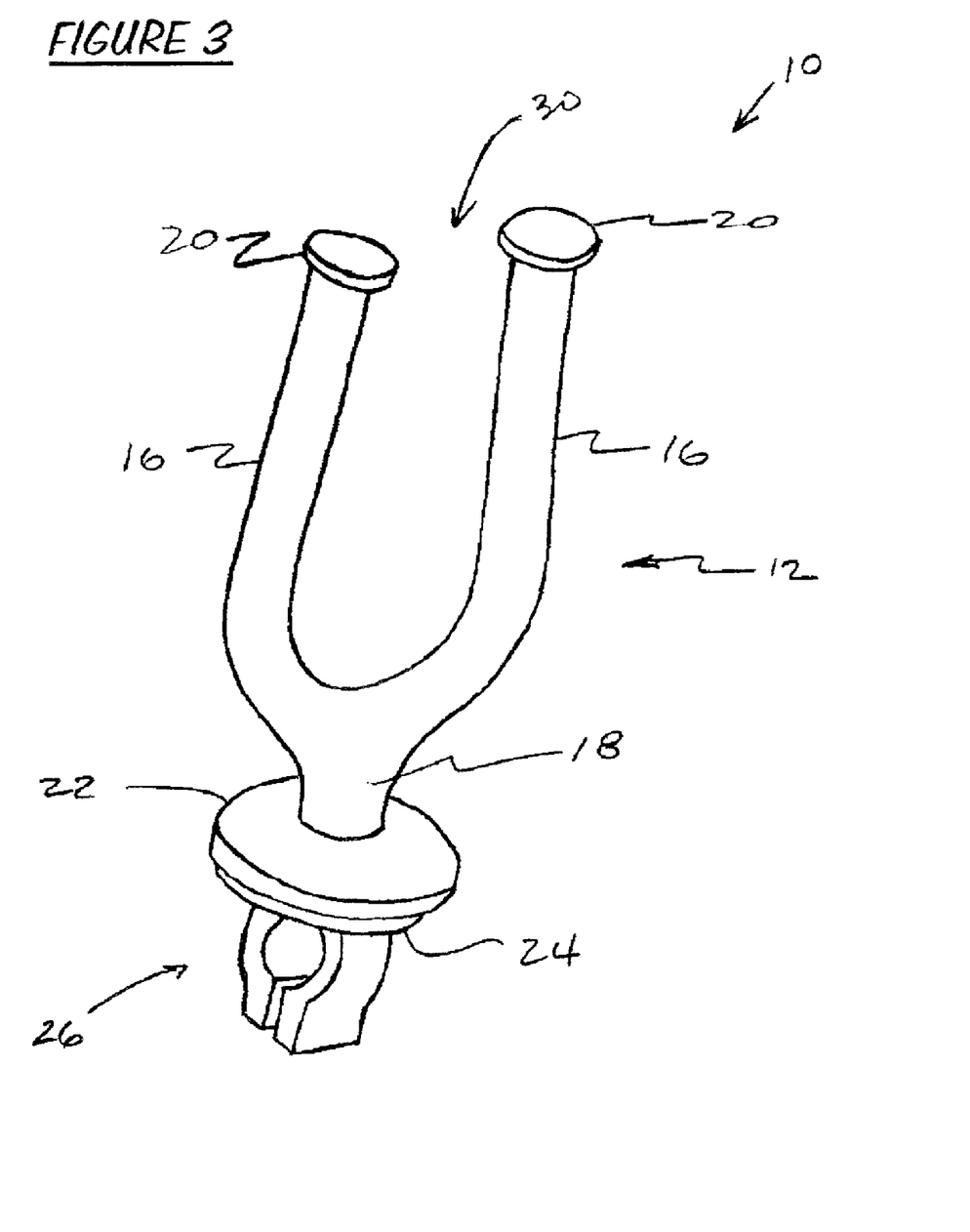
FIG. 3 illustrates the invention embodied as a forked tool bracket structured for mounting on a handle bar or cargo rack of a motor vehicle, such as an ATV.

FIG. 3 is a pictorial view that illustrates the invention embodied as a tool bracket 10 including a holder 12 having a forked portion 14 formed of a pair of interconnected tines 16 projecting from a neck portion 18, each of the tines 16 is optionally tipped with a keeper 20. The neck 18 is joined to a foot portion 22, which is joined for relative rotation with a cooperating shoe portion 24. The shoe 24 is part of a mounting base 26 that is generally configured for attachment to a motorized vehicle, such as an automobile, truck, van, sport utility vehicle (SUV), ATV, or boat. The cooperating foot 22 and shoe 24 portions each include internal structure for engaging a biasing member 28 (shown in subsequent Figures) that is structured apply a rotational force that acts between the holder 12 and the mounting base 26 through the respective cooperating foot 22 and shoe portions 24. The biasing member 28 is structured to urge the foot 22, and thus the interconnected neck 18 and tines 16, to rotate relative to the foot 22 portion of the mounting base 26 when the mounting base 26 is attached to any relatively stationary fixed or movable structure, including the cargo deck or rack of a motorized vehicle, such as an ATV.

The holder portion 12 of the bracket invention includes the forked portion 14 as a means for engaging and retaining the elongated handles or other elongated structural portions of various tools, including but not limited to, garden tools such as rakes and shovels, household tools such as brooms and mops, sports equipment such as archery bows and rifles, building supplies such as lumber and pipes, and similarly shaped tools. The forked portion 14 includes, for example, a pair of spaced-apart tines 16 that are relatively upright when mounted as intended on the fixed or movable structure. The spaced-apart tines 16 form an opening 30 for easy entry therebetween. Both the spacing between the tines 16 and the width of the opening 30 therebetween may be varied as a matter of design choice to accommodate specific applications. The length of the tines 16 is likewise variable as a matter of design choice to accommodate specific applications.

After a TOOL (shown in FIG. 4) is inserted into the holder 12 between the tines 16, gravity encourages the tool to settle between the tines 16 at the juncture with the neck 18. Longer tines 16 tend to retain the tool more effectively when the TOOL is subjected to shock and vibration, for example, during motion of an ATV over rough terrain. However, there will be a practical limit to the length of the tines 16 for any particular application, so that the addition of the optional keepers 20 is used to discourage the tool from exiting through the opening 30 under severe shock and vibration conditions. The optional keepers 20 also permit a strap (not shown) or other mechanism to temporarily close the opening 30. For example, an appropriately sized and spaced-apart "button" holes in an elastic strap are stretched over the keeper 20 of each of the tines 16 and captured under the keepers 20. While the strap closes the opening 30 against loss of the tool, a tearing motion applied to a tongue at one end of the strap will permit quick and easy release. Such elasticized straps are well-known in the art.

Figure 4:
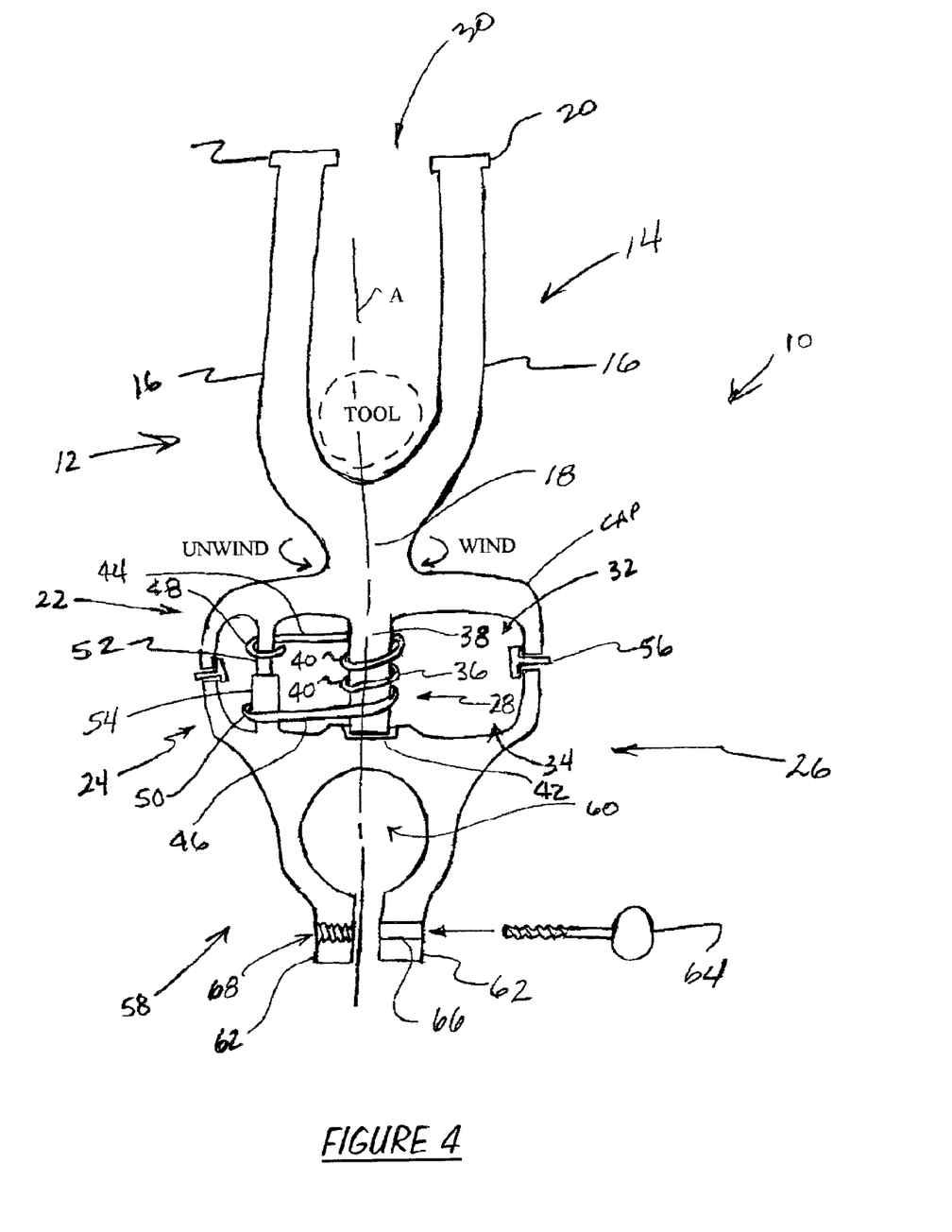
FIG. 4 shows the internal details of cooperating foot and shoe portions as embodied for engaging a biasing member.

FIG. 4 shows the internal details of the cooperating foot 22 and shoe 24 portions as embodied for engaging a biasing member 28. Each of the foot 22 and shoe 24 portions is formed with a respective bowl- or saucer-shaped internal cavity 32, 34 structured to accommodate the biasing member 28. As show in FIG. 4, the biasing member 28 is embodied as a torsional coil spring 36. A spring support pin 38 is interfitted with the torsional coil spring 36 by passing through an aperture formed at the center of the one or more circular turns or coils 40. As embodied according to FIG. 4, the spring support pin 38 is formed integrally with the foot 22 and slips into a cup 42 formed in the floor of the internal cavity 34 of the mounting base 26. According to alternative embodiments of the invention, the spring support pin 38 is formed integrally with the shoe portion 24 of the mounting base 26, or the spring support pin 38 is formed as a separate rod-like element that is retained by slipping into matching cups 42 formed in the floor of the respective internal cavities 32, 34 of the cooperating foot 22 and shoe 24 portions. These and other alternative embodiments are considered equivalents of the embodiment illustrated in FIG. 4 and are similarly contemplated by the present invention.

The biasing member 28, when embodied as the torsional coil spring 36 shown in FIG. 4, includes a pair of fingers 44, 46 extending from opposite ends of the coils 40, each of the fingers 44, 46 having a respective tang 48, 50 formed on the distal end thereof During assembly one of the tangs 48 is fitted over a rod or retaining pin 52 that extends from the floor of the internal cavity 32, while the other tang 50 is fitted over another rod or retaining pin 54 that extends from the floor of the internal cavity 34. Thus, the torsional coil spring 36 is supported by the spring support pin 38 and coupled between the respective retaining pins 52, 54 so that twisting or rotating the holder portion 12 relative to the mounting base 26 in a first direction WIND about the longitudinal axis A of the bracket 10 causes the torsional coil spring 36 to become more tightly wound. As the torsional coil spring 36 becomes more tightly wound, an oppositely acting reactive unwinding force accumulates in the torsional coil spring 36 so that the torsional coil spring 36 tends to unwind a second direction UNWIND having a sense opposite that of the first direction WIND. The unwinding force acts through the foot 22 to urge the holder 12 to rotate in the second direction UNWIND relative to the shoe 24 of the mounting base 26, thereby biasing the tines 16 against a TOOL inserted therebetween.

Optionally, the retaining pins 52, 54 are similarly positioned relative to the longitudinal axis A in the respective internal cavities 32, 34 of the cooperating foot 22 and shoe 24 portions and are sized such that they interfere with one another. Thus, the relative rotation both the in the first direction WIND and the second direction UNWIND is limited to about one full rotation. The torsional coil spring 36 cannot become too tightly wound, which could damage the spring 36 or other components; and an amount of pre-winding of the torsional coil spring 36, whereby a restoring or unwinding pre-load force is provided in the bracket 10, cannot be inadvertently discharged.

Other features illustrated in FIG. 4 include a bushing 56 inserted between the foot 22 and shoe 24 portions to ease the relative rotation and limit wear. The bushing may be nylon, DELRIN©, TEFLON©, or another conventional bushing material and is optionally structured to be self-aligning with the foot 22 and shoe 24 portions. For example, the bushing 56 is "T" shaped having a washer portion in a space between the foot 22 and shoe 24 portions and a foot portion either inside (shown) or outside of the foot 22 and shoe 24 portions to align the washer portion.

According to one embodiment of the invention, the mounting base 26 of the tool bracket 10 is structured with a split ring clamp portion 58 for mounting on a handle bar or cargo rack of a motor vehicle, such as an ATV. The clamp portion 58 includes, for example, a substantially round aperture 60 formed therethrough and a pair of legs 62 structured to accept a fastener 64, such as a thumb screw (shown) or wing screw (not show). For example, one of the legs 62 includes a clearance hole 66 sized to pass the fastener 64, while the other leg 62 includes a threaded hole 68 sized to mate with the fastener 64. Other conventional mechanisms (not shown) for tightening the clamp 58 on a handle bar or cargo rack are considered equivalents of the embodiment illustrated in FIG. 4 and are similarly contemplated by the present invention.

Figure 5:
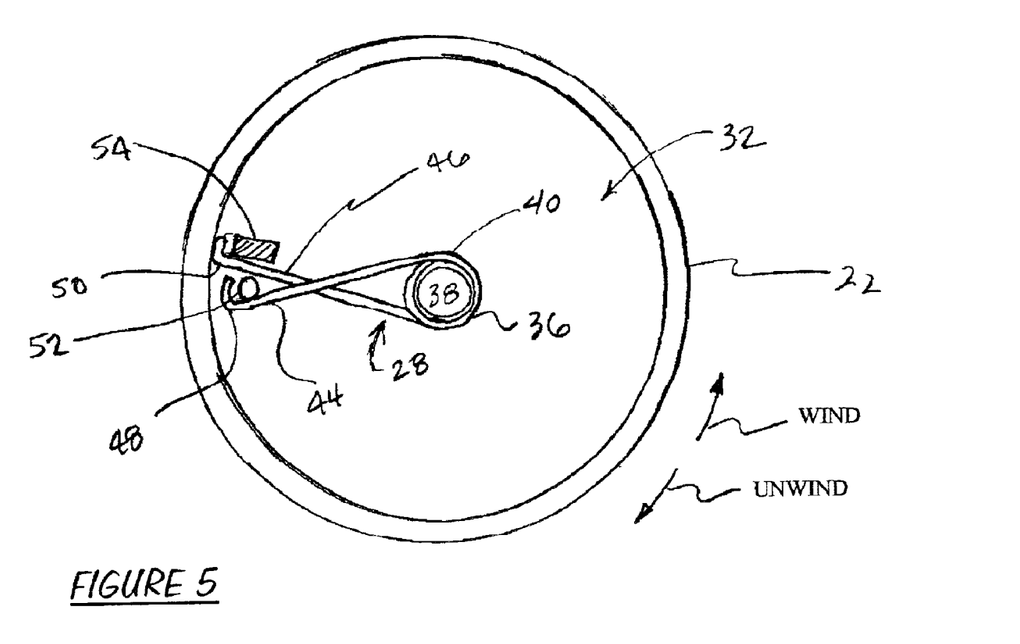
FIG. 5 is a bottom up view into an internal cavity of the foot portion of the holder and cutting through a portion of a retaining pin holding a tang of a torsional coil spring.

FIG. 5 is a bottom up view into the internal cavity 32 of the foot portion 22 of the holder 12 and cutting through a portion of the retaining pin 54 holding the tang 50 of the torsional coil spring 36. As described above, the torsional coil spring 36 is loaded by twisting or rotating the foot 22 relative to the stationary shoe 24 in the first direction WIND. After the TOOL is inserted between the tines 16, the restoring force stored in the torsional coil spring 36 urges the foot 22 to rotate in the opposite or second direction UNWIND. The restoring force biases the tines 16 against the TOOL, thereby holding the TOOL in place.

Optionally, an amount of pre-winding is applied to the torsional coil spring 36 during assembly so that a minimum amount of force is required to initially rotate the holder 12 relative to the mounting base 26. As described above, interference between the retaining pins 52, 54 is ensured by their relative positioning in the respective foot 22 and shoe 24 portions and by their overlapping lengths.

Each tool bracket 10 of the invention can be used singly in combination with any relatively stationary structure. The holder portion 12 is rotated in the first WIND direction to impart a pre-load to the torsional coil spring 36. The TOOL is inserted between the tines 16. Upon being released the holder 12 is rotated in the second UNWIND direction by the torsional coil spring 36, which biases the other end of the elongated portion of the TOOL against the relatively stationary structure, thereby capturing and holding the TOOL against escape from the tool bracket 10. However, the tool bracket 10 may be more effective for the intended purpose when used in combinations of two or more.

Figure 6:
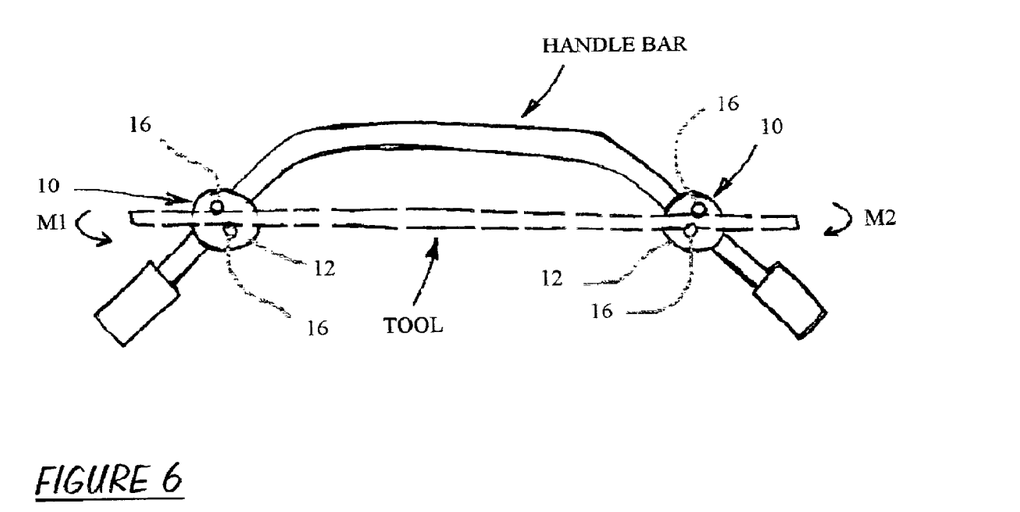
FIG. 6 illustrates the use of the tool bracket of the invention by showing a top down view of a cooperating combination of two of the tool brackets secured to the HANDLE BARS of a vehicle (not shown), such as a motorized ATV, by passing an aperture of the mounting base over the HANDLE BARS, and clamping together the legs with a fastener.

FIG. 6 illustrates the use of the tool bracket 10 of the invention by showing a top down view of a cooperating combination of two of the tool brackets 10 secured to the HANDLE BARS of a vehicle (not shown), such as a motorized ATV, by passing the aperture 60 of the mounting base 26 over the HANDLE BARS, and clamping together the legs 62 with the fastener 64. The TOOL is inserted between the tines 16 of one of the tool brackets 10 and rotated toward the second tool bracket 10. The holder portion 12 of the second tool bracket 10 is rotated in the WIND direction to align the opening 30 therein with the elongated portion of the TOOL. The TOOL is then inserted between the tines 16 of the second tool brackets 10. Upon being released the two holders 12 each tend to rotate in the second UNWIND direction due to the reactive rotational force exerted by the biasing member 28. The biasing members 28, embodied as torsional coil springs 36, of each stationary tool bracket 10 biases an end of the elongated portion of the TOOL against the other respective relatively stationary tool bracket 10, thereby capturing between the two respective relatively stationary tool brackets 10 and holding the TOOL against escape from the tool brackets 10. As illustrated, the tool brackets 10 are mounted for rotation of the respective holder portions 12 in opposite directions, i.e., clockwise and counterclockwise. Merely inverting the biasing member 28, whether as the torsion coil spring 36 embodiment or another embodiment, causes the respective first and second rotational directions WIND and UNWIND to be reversed. When two such oppositely acting tool brackets 10 are used in combination, the opposing biasing members 28 impart opposing moments M1, M2, as indicated by the arrows, that tends to bow the TOOL into a simple curving bend.

Figure 7:
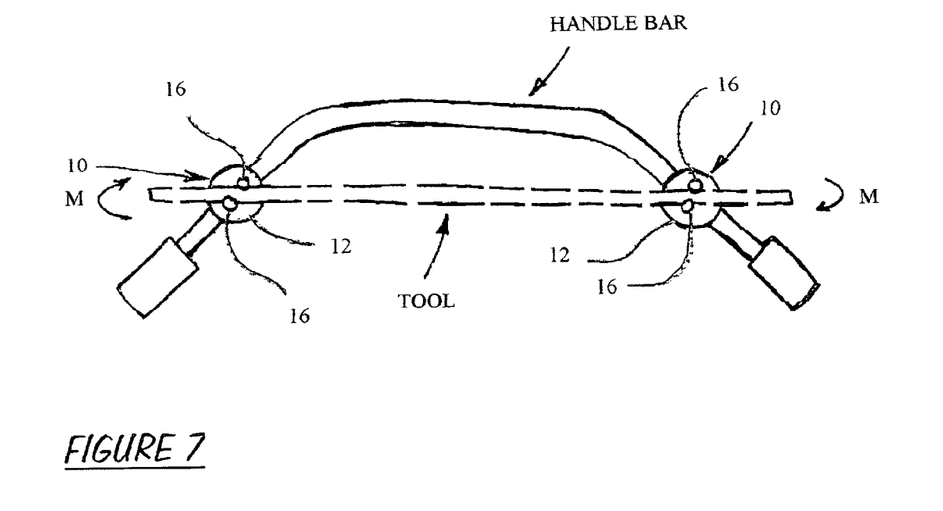
FIG. 7 shows another top down view of a combination of two of the tool brackets mounted on the HANDLE BARS of a vehicle (not shown) that illustrates the use of two of the tool bracket of the invention mounted for rotation of both of the respective holder portions in the same direction.

FIG. 7 shows another top down view of a combination of two of the tool brackets 10 mounted on the HANDLE BARS of a vehicle (not shown) that illustrates the use of two of the tool bracket 10 of the invention mounted for rotation of both of the respective holder portions 12 in the same direction, i.e., clockwise (shown) or counterclockwise (not shown). Accordingly, the respective biasing member 28 are similarly assembled with the foot 22 and shoe 24 portions of the respective tool brackets 10 so that they both operate in the same direction. When two such similarly acting tool brackets 10 are used in combination, the respective biasing members 28 impart similar moments M, as indicated by the arrows, that tend to bow the TOOL into a more complex S-bend.

Figure 8:
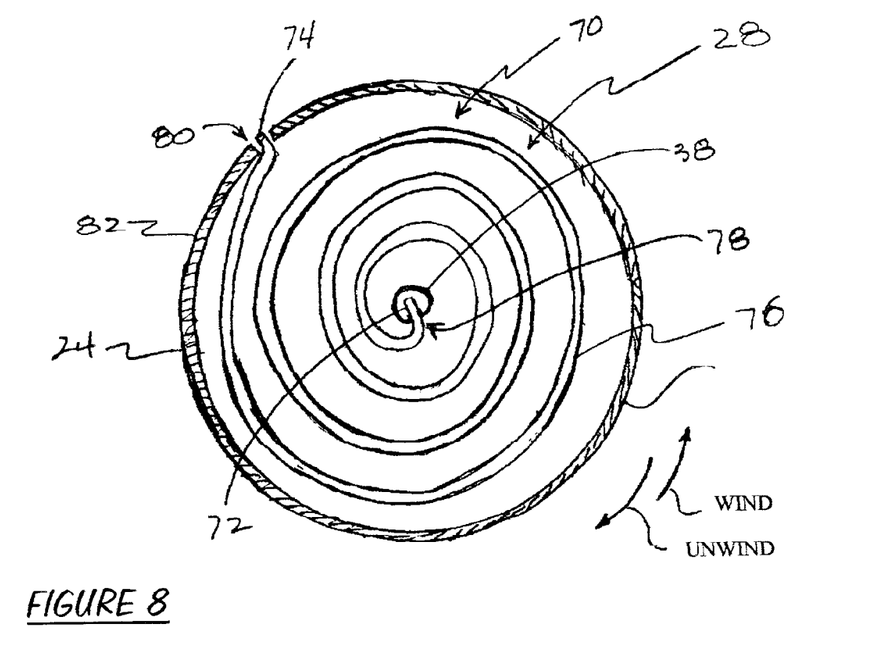
FIG. 8 is another bottom up view into the internal cavity of the foot portion of the holder and cutting through a portion of the shoe portion of the mounting base.

FIG. 8 is another bottom up view into the internal cavity 32 of the foot portion 22 of the holder 12 and cutting through a portion of the shoe portion 24 of the mounting base 26. FIG. 8 illustrates the biasing member 28 of the invention embodied as a spiral coiled torsion spring 70. As embodied in FIG. 6, the spiral coiled spring 70 includes a tang 72, 74 at either end of a spiral coil portion 76. The tangs 72, 74 are captured by respective keeper slots 78, 80 formed in the foot 22 and shoe 24 portions. For example, the spring support pin 38 is formed integrally with the foot 22 and includes a first keeper slot 78 and a second keeper slot 80 is formed in the exterior lip 82 of the shoe portion 24. The spiral coiled spring 70 is thus tightly wound by turning or rotating the foot 22 relative to the stationary shoe 24 in the first direction WIND to instill a reactive unwinding or restoring force acting in the opposite or second direction UNWIND. After the TOOL is inserted between the tines 16, the restoring force stored in the spiral coiled spring 70 urges the foot 22 to rotate in the second direction UNWIND. The restoring force biases the tines 16 against the TOOL, thereby holding the TOOL in place.

Figure 9:
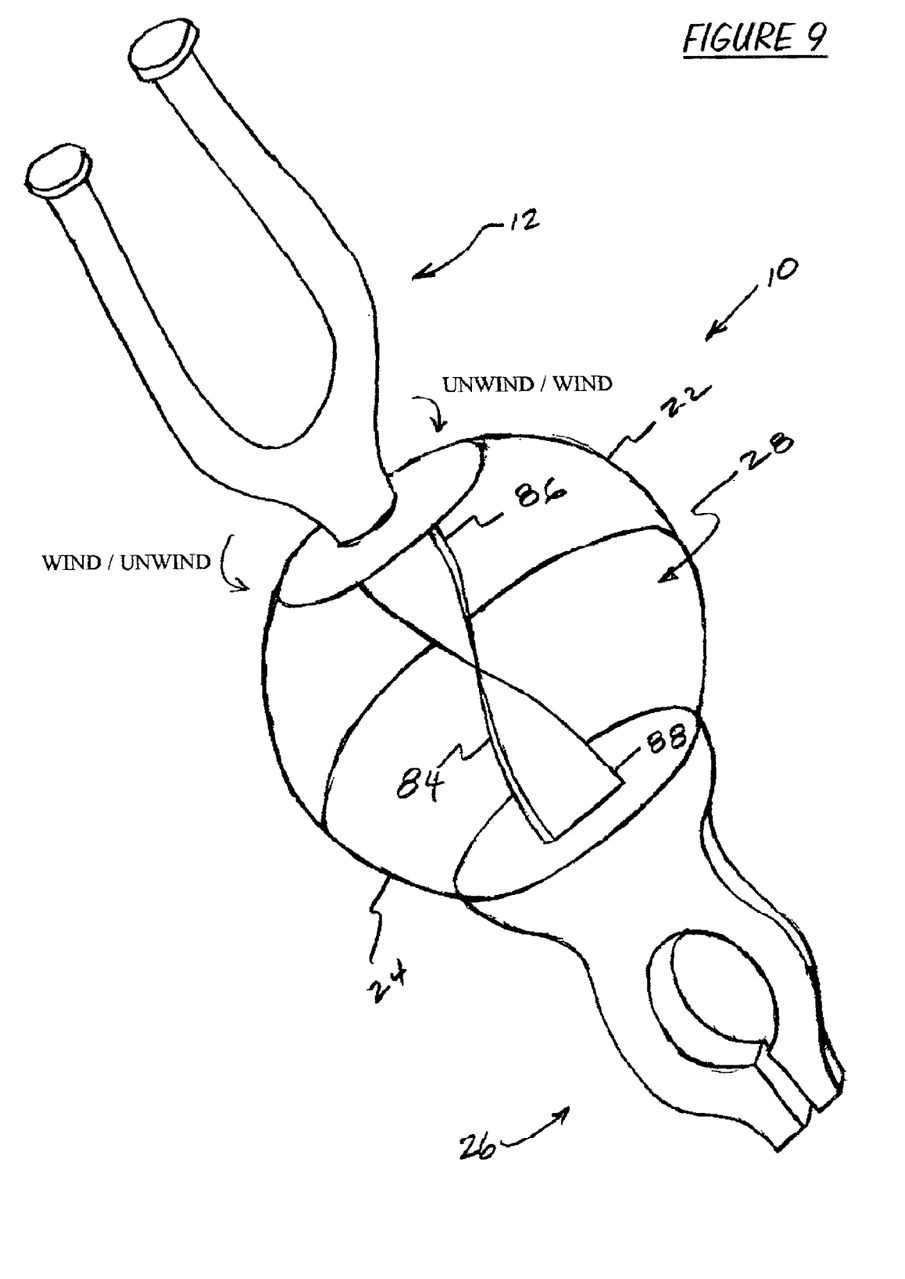
FIG. 9 is a pictorial view of the tool bracket wherein the biasing member is embodied as a straight bar spring.

FIG. 9 is a pictorial view of the tool bracket 10 wherein the biasing member 28 is embodied as a straight bar spring 84. The straight bar spring 84 is formed having either a rectangular cross-section (shown) or a circular cross-section (not shown). Opposite ends 86, 88 of the straight bar spring 84 are coupled into the respective foot 22 and shoe 24 portions of the holder 12 and mounting base 26. The tool bracket 10 having the biasing member 28 embodied as a straight bar spring 84 operates similarly to each of the above described embodiments having the biasing member 28 embodied as the respective torsion coil spring 36 and spiral coiled spring 70, except that the straight bar spring 84 can be rotated either clockwise (not shown) or counterclockwise (shown) without being physically inverted relative to the holder 12 and mounting base 26. Thus, the winding force is applied to rotate the holder 12 in either direction relative to the mounting base 26, and the straight bar spring 84 operates to provide a reactive unwinding force in the opposite direction. The straight bar spring 84 is formed using any suitable resilient spring material, including metal spring materials such as spring steel and natural and synthetic elastomers such as rubber and plastic.

Figure 10:
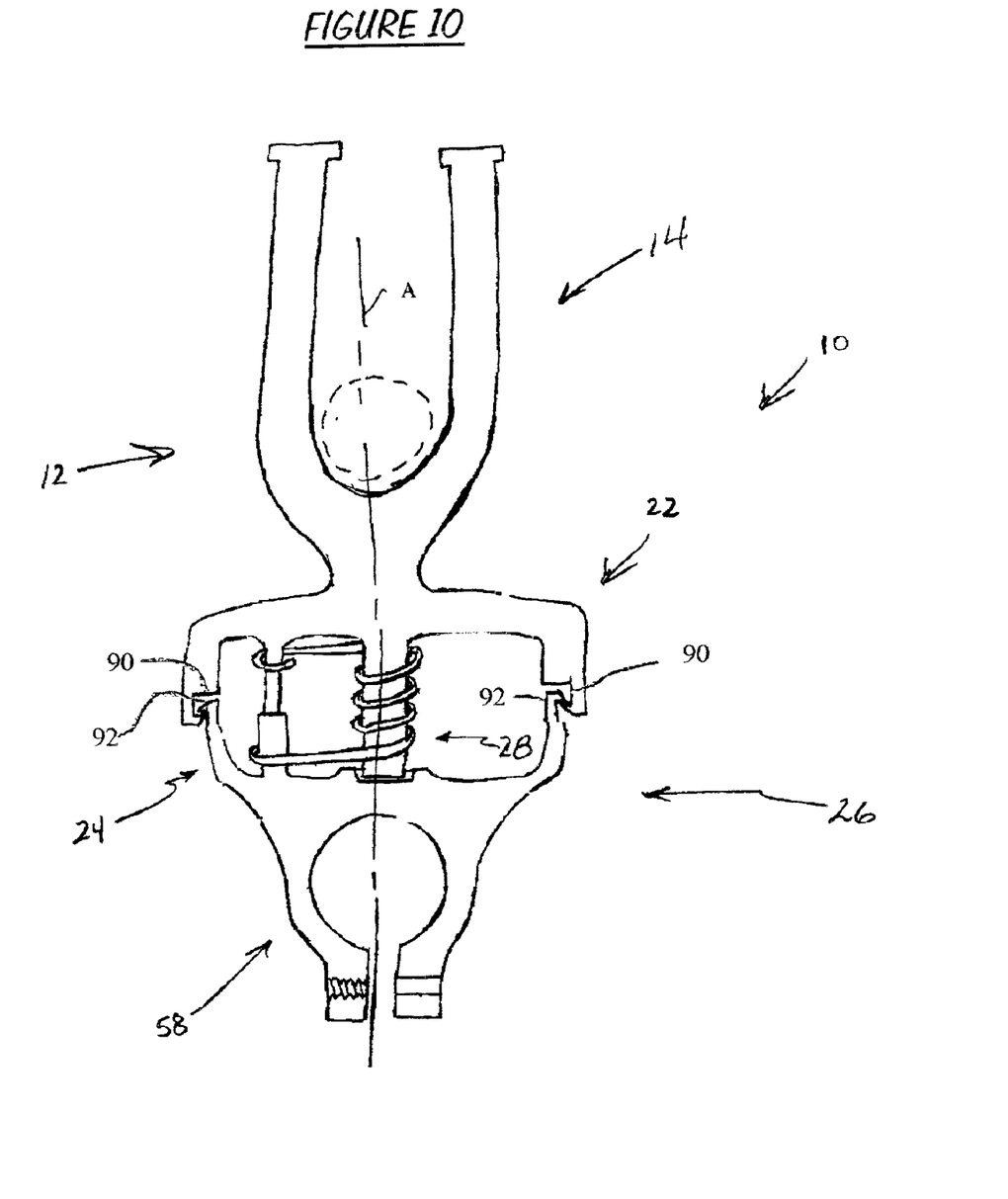
FIGS. 10 and 11 are cross-sectional views that provide different embodiments of the interface between the foot and shoe portions of the respective holder and mounting base.
Figure 11:
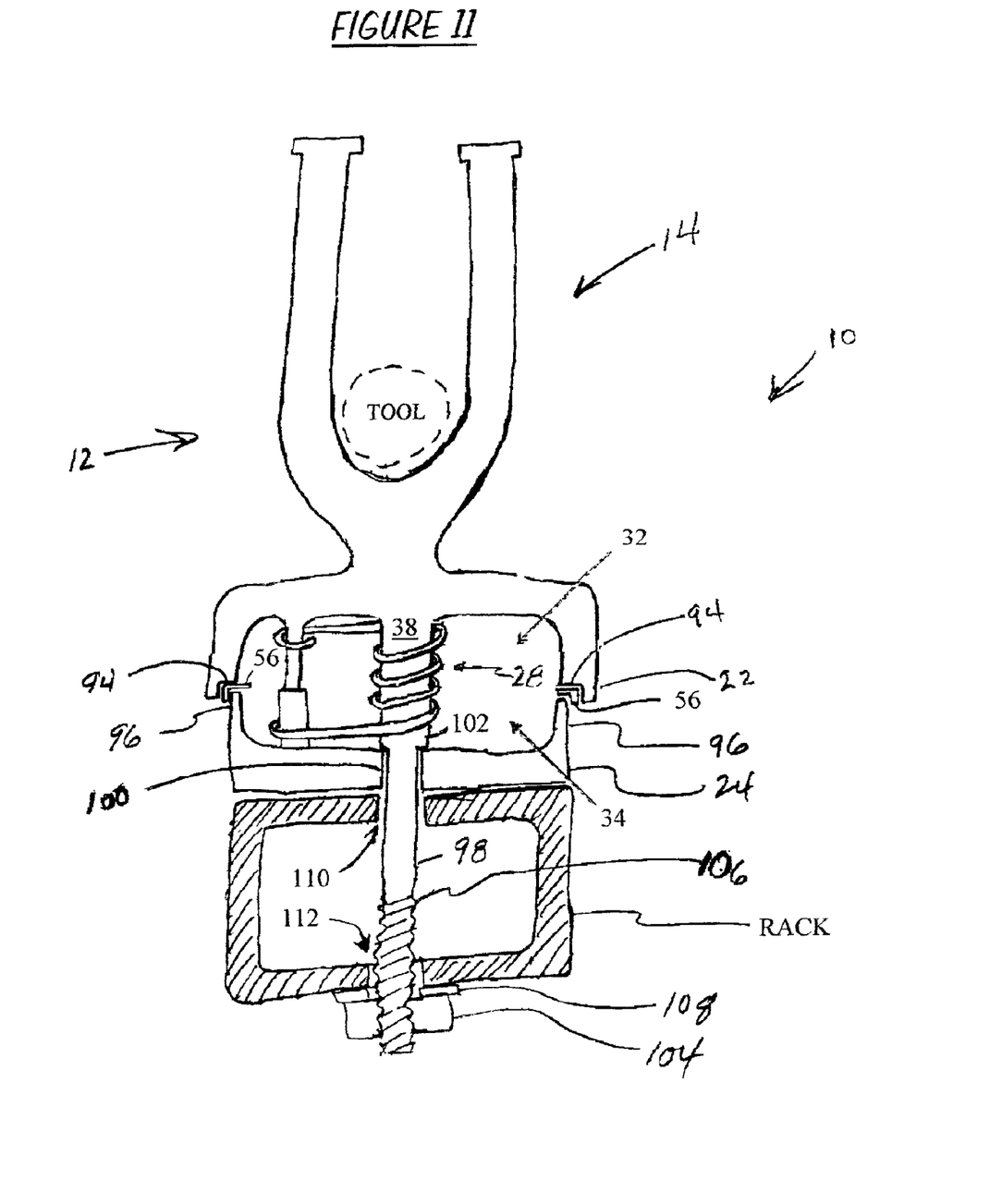

FIGS. 10 and 11 are cross-sectional views that provide different embodiments of the interface between the foot 22 and shoe 24 portions of the respective holder 12 and mounting base 26. In FIG. 10, the foot portion 22 includes an internal annular groove 90 that interfits with a lip 92 that extends radially from the outer surface of the shoe portion 24. The internal annular groove 90 and lip 92 may each include inclined edges that cooperate to permit the foot portion 22 to fit over the shoe portion 24, whereby the lip 92 enters and becomes interlocked with the internal annular groove 90. When the foot 22 and shoe 24 portions are both formed of a resilient plastic material, the foot 22 can expand while the shoe 24 compresses so that the foot 22 and shoe 24 portions snap together easily, even when relative size tolerances are less controlled.

When the neck 18 and tines 16 of the forked portion 14 and the clamp portion 58 of the mounting base 26 are formed of a resilient plastic material, the foot 22 and shoe 24 portions can be formed integrally therewith, respectively. Alternatively, the forked portion 14 and the clamp portion 58 may be formed of a more rigid plastic or metal material and joined to the respective foot 22 and shoe 24 portions using conventional means, such as mold-over bonding, adhesive bonding, interconnecting shapes, pinning, or another of the well-known conventional mechanisms for fixing together structures formed of dissimilar materials.

FIG. 11 illustrates yet another interface between the foot 22 and shoe 24 portions of the respective holder 12 and mounting base 26. In FIG. 11 the foot portion 22 includes an annular groove 94 formed in the edge thereof. The shoe portion 24 is formed having a straight edge 96 of a smaller diameter than that of the annular groove 94 on the foot portion 22 so that the straight edge 96 fits inside of the annular groove 94. While the annular groove 94 can be formed on the edge of the shoe portion 24 and the straight edge 96 can be formed on the foot portion 22, the embodiment shown in FIG. 11 is more effective for protecting the biasing mechanism 28 from contamination from rain and dust when the tool bracket 10 is mounted in the upright orientation shown.

The bushing 56, shown having an "L" shape, may be inserted between the foot 22 and shoe 24 portions to ease the relative rotation and limit wear.

FIG. 11 also shows the spring support pin 38 is embodied as a threaded rod 98 that extends from the neck portion 18 in the floor of the foot portion 22 opposite the tines 16, and through an aperture 100 in the floor of the shoe portion 24. The threaded rod 98 includes a smooth shoulder portion 102 that is oversized relative to the aperture 100. The threaded rod 98 thus stops on the floor of the interior cavity 34 of the shoe portion 24 and ensures that threading a nut 104 onto a threaded portion 106 of the rod 98 does not unduly stress the foot 22 and shoe 24 portions. The nut 104 and a washer 108 are used to secure the bracket 10 to a cargo deck or RACK of a motorized vehicle, such as an ATV, when the threaded rod 98 is passed through apertures 110, 112.

While the preferred embodiment of the invention has been illustrated and described, it will be appreciated that various changes can be made therein without departing from the spirit and scope of the invention.

I claim:

1. A tool bracket, comprising:
    a mounting base formed along a rotational axis;
    a holder structured to engage an elongated portion of a tool, the holder having a forked tool engaging structure formed along a rotational axis that is common with the rotational axis of the mounting base and joined for rotation relative to the mounting base about the common rotational axis; and
    a resilient biasing member coupled to each of the holder and the mounting base and being structured to promote rotation between the holder and the mounting base about the common rotational axis.

2. The tool bracket of claim 1 wherein the biasing member is further structured to apply a rotational force that acts between the holder and the mounting base.

3. The tool bracket of claim 1 wherein the tool engaging structure formed substantially symmetrically about the rotational axis.

4. The tool bracket of claim 1 wherein the biasing member is a torsional spring selected from the group of torsional springs comprising a torsional coil spring, and a straight bar spring.

5. The tool bracket of claim 1 wherein the mounting base is structured to attach to any relatively stationary fixed or movable structure.

6. The tool bracket of claim 1 wherein the mounting base is structured having a flexible clamp portion with a substantially round aperture formed therein and a clamping mechanism for securing the clamp portion to a substantially round structure external to the tool bracket and passing through the round aperture.

7. The tool bracket of claim 1 wherein the holder includes an integral neck portion between a forked portion of the holder and the mounting base with-the forked portion being projected from the integral neck portion.

8. The tool bracket of claim 7 wherein the forked portion is further structured to retain an elongated portion of a tool.

9. A tool bracket comprising:
    a mounting base having a mechanism for attaching to an external structure;

a forked tool holder rotatably coupled to the mounting base and having pair of interconnected tines projecting from a neck portion along an axis of rotation; and a resilient biasing member coupled between the mounting base and the forked tool holder for urging relative rotation between the forked tool holder and the mounting base about the axis of rotation of the forked tool holder.

10. The tool bracket of claim 9 wherein the mounting base includes an internal cavity formed opposite from the mechanism for attaching to an external structure and having structure for engaging a first portion of the resilient biasing member.

11. The tool bracket of claim 9 wherein the mechanism of the mounting base for attaching to an external structure is a clamp portion structured for mounting on a substantially round external structure.

12. The tool bracket of claim 11 wherein the clamp portion comprises a pair of spaced-apart legs formed with a substantially round aperture therethrough for passing over the external structure and being secured thereto.

13. A tool bracket comprising:

a mounting base having a mechanism for attaching to an external structure;

a forked tool holder rotatably coupled to the mounting base and having pair of interconnected tines projecting from a neck portion;

a resilient biasing member coupled between the mounting base and the forked tool holder for urging relative rotation between the forked tool holder and the mounting base; and wherein the forked tool holder includes an internal cavity formed opposite from the neck portion and the interconnected tines projecting therefrom, the internal cavity having structure for engaging a first portion of the resilient biasing member and further having structure for engaging a second portion of the resilient biasing member opposite from the first portion.

14. The tool bracket of claim 13 wherein the resilient biasing member further comprises a torsional spring.

15. A bracket for securing a tool having an elongated portion, the bracket comprising:

an attaching means and a tool engaging means both being formed along a common axis of rotation wherein:

the attaching means is structured for attaching to an external structure, the tool engaging means is structured for securely engaging an elongated portion of a tool, and the engaging means is rotatably coupled to the attaching means for mutual relative rotation about the common axis of rotation; and a means coupled between the engaging means and the attaching means for resiliently rotationally biasing the engaging means relative to the attaching means about the common axis of rotation.

16. The bracket of claim 15 wherein the biasing means is structured to supply a torsional force between the engaging means and the attaching means.

17. The bracket of claim 15 wherein the biasing means is a torsional spring.

18. The bracket of claim 15 wherein the engaging means includes means for retaining an elongated portion of a tool that is engaged therewith.

19. A tool bracket for engaging and retaining an elongated portion of a tool, the tool bracket comprising:

a tool holder having a foot portion with a forked portion extending therefrom along an axis of rotation;

a mounting base having a shoe portion rotatably interconnected with the foot portion of the tool holder for rotation about the axis of rotation; and a spring positioned between the foot portion and the shoe portion, the spring being coupled to each of the foot portion and the shoe portion and supplying a reactive rotational force about the axis of rotation in an opposite direction to a rotational force input from an external source.

20. The tool bracket of claim 19 wherein the spring is a torsional coil spring.

21. A tool bracket for engaging and retaining an elongated portion of a tool, the tool bracket comprising:

a forked tool holder comprising a neck portion extending from a foot portion and a pair of elongated tines extended from the neck portion along a common axis of rotation, the foot portion having an open mouth cavity formed therein opposite from the neck portion and tines;

a shoe portion separate from the forked tool holder, the shoe portion having an open mouth cavity formed therein opposite from the forked tool holder and being coupled to the foot portion of the tool holder along the common axis of rotation for mutual relative rotation about the common axis of rotation with the two open mouth cavities being joined in a combined cavity; and a spring within the combined cavity and coupled between the shoe portion and the foot portion of the tool holder for relatively rotationally biasing the forked tool holder and shoe portion about the common axis of rotation.

22. The tool bracket of claim 21 wherein the spring further comprises a torsional spring.

23. The tool bracket of claim 21 wherein the shoe portion further comprises a means for engaging an external structure.

* * * * *